US012252374B2

(12) United States Patent
Richardson

(10) Patent No.: US 12,252,374 B2
(45) Date of Patent: Mar. 18, 2025

(54) REELING DEVICE

(71) Applicant: Ewart Richardson, Chorleywood (GB)

(72) Inventor: Ewart Richardson, Chorleywood (GB)

( * ) Notice: Subject to any disclaimer, the term of this patent is extended or adjusted under 35 U.S.C. 154(b) by 345 days.

(21) Appl. No.: 17/776,175

(22) PCT Filed: Nov. 20, 2020

(86) PCT No.: PCT/GB2020/052971

§ 371 (c)(1),
(2) Date: May 11, 2022

(87) PCT Pub. No.: WO2021/099800

PCT Pub. Date: May 27, 2021

(65) Prior Publication Data

US 2022/0380172 A1 Dec. 1, 2022

(30) Foreign Application Priority Data

Nov. 21, 2019 (GB) ..................................... 1916981

(51) Int. Cl.
*B65H 75/44* (2006.01)
*B66D 1/26* (2006.01)
*B66D 1/38* (2006.01)
*B66D 1/39* (2006.01)

(52) U.S. Cl.
CPC ........... *B65H 75/4452* (2013.01); *B66D 1/26* (2013.01); *B66D 1/38* (2013.01); *B66D 1/39* (2013.01); *B65H 2701/34* (2013.01); *B66D 2700/0191* (2013.01)

(58) Field of Classification Search
CPC ............ B65H 75/4452; B65H 75/4455; B65H 2701/34; B65H 75/4449; B66D 1/26; B66D 1/38; B66D 1/39; B66D 2700/0191
See application file for complete search history.

(56) References Cited

U.S. PATENT DOCUMENTS 3,822,834 A * 7/1974 Fjarlie ................ B65H 75/4452 242/388.5
4,565,333 A 1/1986 Meneian
5,526,997 A 6/1996 Karczmer
5,921,497 A * 7/1999 Utley, Jr. ............. H01R 35/025 242/388.6
9,908,754 B2 * 3/2018 Hall ......................... B66D 1/12
2017/0280541 A1 9/2017 Limmer et al.

FOREIGN PATENT DOCUMENTS

DE 2803509 A1 8/1979
DE 3008544 A1 9/1981
DE 10040195 A1 * 2/2002 ............... B66D 1/38
EP 2768100 A1 8/2014
GB 866756 A 4/1961
JP S5858817 A 4/1983

* cited by examiner

*Primary Examiner* — Sang K Kim
*Assistant Examiner* — Nathaniel L Adams
(74) *Attorney, Agent, or Firm* — Craft Chu PLLC; Andrew W. Chu

(57) ABSTRACT

A reeling device for the controlled coiling and uncoiling of a cable has a first end that is fixed and a second end that is movable relative to the first end. The cable is unbroken between its first and second ends. The reeling device includes first and second reels about which the cable is coiled. The first and second reels are coaxial. The first reel is fixed against rotation and axial movement, and the second reel is rotatable about the axis with such rotation causing axial movement of the second reel relative to the first reel.

21 Claims, 9 Drawing Sheets

REELING DEVICE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a reeling device. In particular to a reeling device for the controlled coiling and uncoiling of a cable, which has the facility to lift and lower a load connected to an end of the cable. The present invention therefore relates to a reeling/lifting device.

2. Description of Related Art Including Information Disclosed Under 37 CFR 1.97 and 37 CFR 1.98

It is widely known in the art to wind and unwind cables from a reeling device, wherein one end of the cable is fixed relative to the remainder of the cable, for providing a stationary electrical connection location, and the other end of the cable can be unreeled for deploying a desired length of cable. Such devices may be used when it is desired to lower and raise a device from a ceiling or otherwise. These devices must however make provision to avoid the stationary portion of the cable from twisting, kinking and ultimately failing as the reel is rotated during winding and unwinding of the cable.

There are two known solutions in the reeling device art.

In a first solution, slip rings are used to provide an electrical connection between the stationary and rotatable portions of the cable. A problem with slip rings, however, is that they can be the source of undesirable electrical noise and intermittent electrical contact. This is a particular concern when such a reeling device is used in connection with audio and data cables.

In a second solution, an arrangement such as that disclosed in U.S. Pat. No. 5,526,997 is used. This arrangement comprises main and secondary reels that include a common hub member that is formed with a hole extending therethrough from the main reel to the secondary reel. The cable is wound upon the two reels with a first end portion of the cable being coiled upon the main reel, an intermediate portion thereof extending through the hole formed in the common hub member and a second end portion of the cable being coiled about the secondary reel. The second end portion of the cable is substantially shorter than the first end portion and includes an end that is fixed to the housing. With this arrangement, as the first portion of the cable is fully unwound from the main reel, the second portion of the cable is simultaneously unwound from and then rewound onto the secondary reel. A variation on this scheme uses a twin rotating reel and a rotating guide sheave to feed the cable from one of the rotating reels to a fixed reel and a further variation uses a twisting cable chain. Whilst these arrangements avoid the need for slip rings, they introduce alternative problems. The cable is usually coiled on the main reel in successive radial layers. This renders accurate positioning difficult, with accuracy decreasing over time due to compression of the cable. Such arrangements also require a 'standing' length of cable to be retained in the device (in some cases equal to or greater than the stroke of the device). In some applications, overall cable length can be critical and, in the invention described below, only a relatively tiny amount of cable is not actually deployed in the stroke of the device.

BRIEF SUMMARY OF THE INVENTION

The present invention arose in an attempt to provide a reeling device that addresses the above problems with the prior art.

According to the present invention in a first aspect there is provided a reeling device for the controlled coiling and uncoiling of a cable having a first end that is fixed and a second end that is movable relative to the first end, the cable is unbroken between its first and second ends, the reeling device comprises first and second reels about which the cable is coiled, wherein the first and second reels are coaxial, the first reel is fixed against rotation and axial movement, and the second reel is rotatable about the axis with such rotation causing axial movement of the second reel relative to the first reel.

The first reel and the second reel therefore have a common axis. Each reel is preferably substantially cylindrical in shape.

The first end of the cable is preferably fixed to allow for a stationary connection to be made. The cable may support any suitable device at its second end. The cable may be an electrical cable or an optic fibre. In one exemplary arrangement a microphone is supported and the cable is an electrical cable. The reeling device is suitable for lifting objects (e.g. a microphone or camera).

An intermediate guide (or first guide) is preferably provided for guiding the cable between the reels. The intermediate guide is preferably rotatable about the axis by a motor. Rotation of the intermediate guide preferably causes axial movement of the intermediate guide.

By such axial movement, the intermediate guide may be suitably axially aligned with the point of the second reel at which the cable is fed on/off the second reel at all times. The intermediate guide further, as it rotates, acts to coil/uncoil the cable from the first reel.

The cable may be guided substantially tangentially with respect to the second reel at all times during reeling and unreeling of the cable.

In a preferred embodiment, the configuration of the intermediate guide is such that the cable is also guided substantially tangentially with respect to the first reel at all times and such that the intermediate guide is also suitably axially aligned with the point of the first reel at which the cable is fed on/off the first reel at all times.

The rotation and/or axial movement of the intermediate guide are preferably proportional to the rotation and/or axial movement of the second reel. The intermediate guide is preferably arranged to coil/uncoil the cable from the first reel and/or the second reel.

A gear drive may be provided for maintaining proportionality of the rotational and axial movement between the second reel and the intermediate guide. The intermediate guide may be driven to rotate by an electric motor.

The intermediate guide may comprise at least one pulley which is preferably mounted for rotation with its radial plane being substantially parallel to the common axis of the reels.

The intermediate guide may comprise an arm, which may comprise one or more guide members for guiding the cable with respect to the first and second reels.

The arm may comprise at least one bridge portion and at least one support portion. The support portion or support portions may be directly or indirectly driven to rotate about the common axis of the reels. The support portion or support portions may extend in a substantially radial or perpendicular direction about the common axis. The bridge portion or bridge portions may extend in a substantially axial direction. Preferably the at least one bridge portion extends in a direction which is substantially perpendicular to the direction in which the at least one support portion extends. The bridge portion of the arm is configured to connect the guide members.

The arm preferably comprises first and second guide members, wherein the first guide member overlaps with the first reel when viewed in a radial direction and the second guide member overlaps with the second reel when viewed in a radial direction.

The first and second guide members may be located at or adjacent opposing ends of the bridge portion of the arm.

The points of the first and second guide members at which the cable is fed on/off the first and second guide members are preferably respectively axially aligned with the first and second reels at the points at which the cable is fed on/off the first and second reels.

One or more guide members may each comprise one or more pulleys. Each pulley is preferably mounted for rotation with its radial plane being substantially parallel to the common axis of the reels.

The one or more guide members are preferably retained in tangential alignment with the first and second reels respectively at all times.

In one embodiment, the first and second reels have the same diameter. Preferably, the rotation and axial movement of the second reel are double the speed of the rotation and axial movement of the intermediate guide.

In another embodiment, the first and second reels have different diameters. For example, the diameter of the first reel is smaller than the diameter of the second reel. The second reel may be arranged to surround at least a portion of the first reel in at least one axial position of the second reel.

In the present invention, the cable is preferably helically coiled about each of the first and second reels in a single layer without overlap.

The first reel and/or the second reel may comprise a helical groove for receiving the cable.

An end guide (or second guide) may be provided for guiding the cable on and off the second reel. The end guide may be fixed against axial movement. The end guide may comprise a guide wheel.

The reeling device of the present invention may comprise an electromagnetic brake on an output side of a motor drive gearbox. The electromagnetic brake may be directly connected to the first reel.

In one embodiment of the invention, a plurality of intermediate guides for guiding a plurality of cables between the first and second reels is provided, wherein each intermediate guide is arranged to guide a respective one of the plurality of cables between the first and second reels. Each of the intermediate guides may be fixed for rotation with the other intermediate guides.

In this embodiment, each of the intermediate guides is preferably rotationally fixed with respect to the other intermediate guide or intermediate guides, such that the intermediate guides are rotatable about the axis with each other. To achieve this, the intermediate guides may all be fixed with respect to each other to form a unitary intermediate guide assembly. In some embodiments, the intermediate guides may be fixed to one or more supports. Rotation of the support(s) thus effects rotation of the intermediate guides.

In one embodiment, each of the plurality of intermediate guides comprises an arm which comprises first and second guide members. Each arm may comprise a bridge portion and one or more support portions. In a preferred embodiment, the arms have at least one common support portion for supporting the bridge portions of each arm.

According to the present invention in a further aspect, there is provided a system comprising a plurality of reeling devices in accordance with the first aspect of the present invention and a frame or device that is attached at the second ends of the cables of the plurality of reeling devices, wherein a controller is provided for synchronously coiling/uncoiling the cables for raising or lowering the frame or device.

BRIEF DESCRIPTION OF THE SEVERAL VIEWS OF THE DRAWINGS

Non-limiting embodiments of the present invention will now be described, by way of example only, with reference to the accompanying drawings.

DETAILED DESCRIPTION OF THE INVENTION

Figure 1:
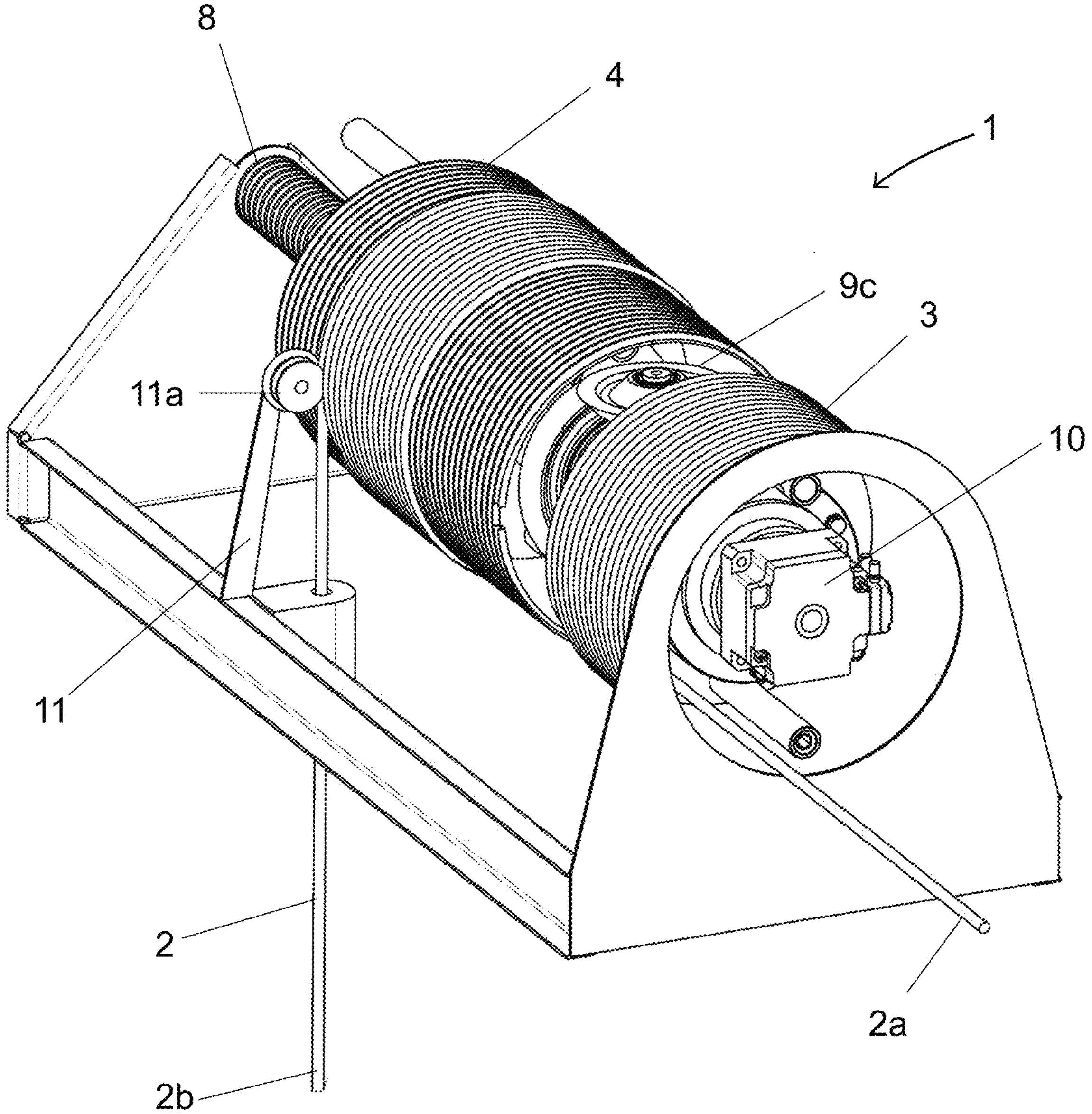
FIG. 1 is a front perspective view of a reeling device according to a first embodiment of the present invention.

With reference to FIGS. 1 to 4, there is shown a reeling device 1 according to a first embodiment of the present invention. The reeling device 1 is configured for the controlled coiling and uncoiling of a cable 2 having a first end 2*a* that is fixed and a second end 2*b* that is movable relative to the first end. The first end 2*a* is fixed to allow for a stationary connection to be made. The cable may support any suitable device at its second end. The cable may be an electrical cable or an optic fibre. In one exemplary arrangement a microphone (not shown) is supported and the cable 2 is an electrical cable. The cable 2 is unbroken between its first and second ends. The reeling device 1 comprises first and second reels 3, 4 about which the cable 2 is coiled. FIG. 3*a* shows the cable 2 fully wound/coiled and FIG. 3*b* shows the cable 2 fully unwound/uncoiled. The first and second reels 3, 4 are coaxial. The first reel 3 is fixed against rotation and axial movement. The second reel 4 is rotatable about the axis with such rotation causing axial movement of the second reel 4 relative to the first reel 3.

Figure 2:
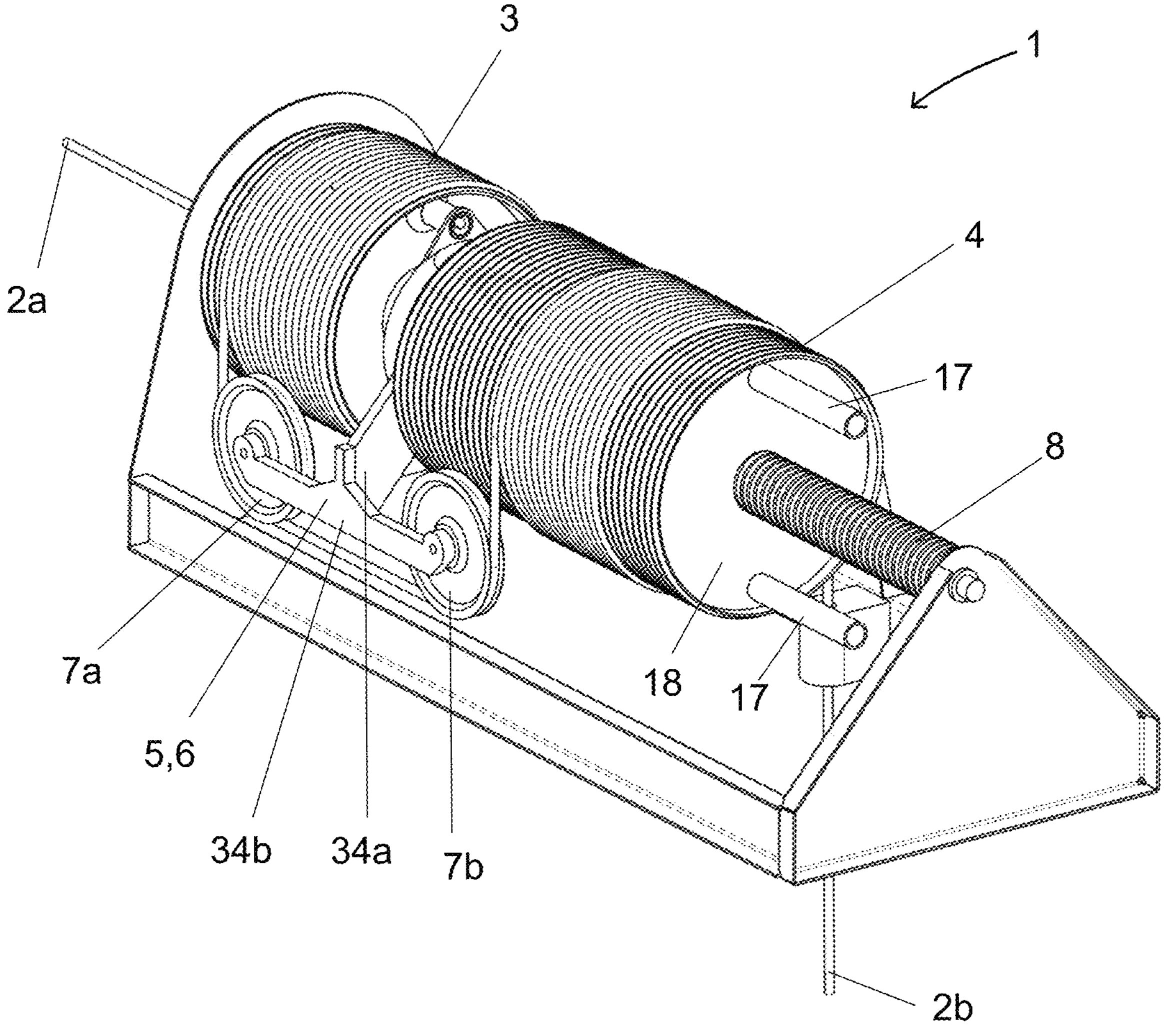
FIG. 2 is a rear perspective view of the reeling device of FIG. 1.
Figure 3A:
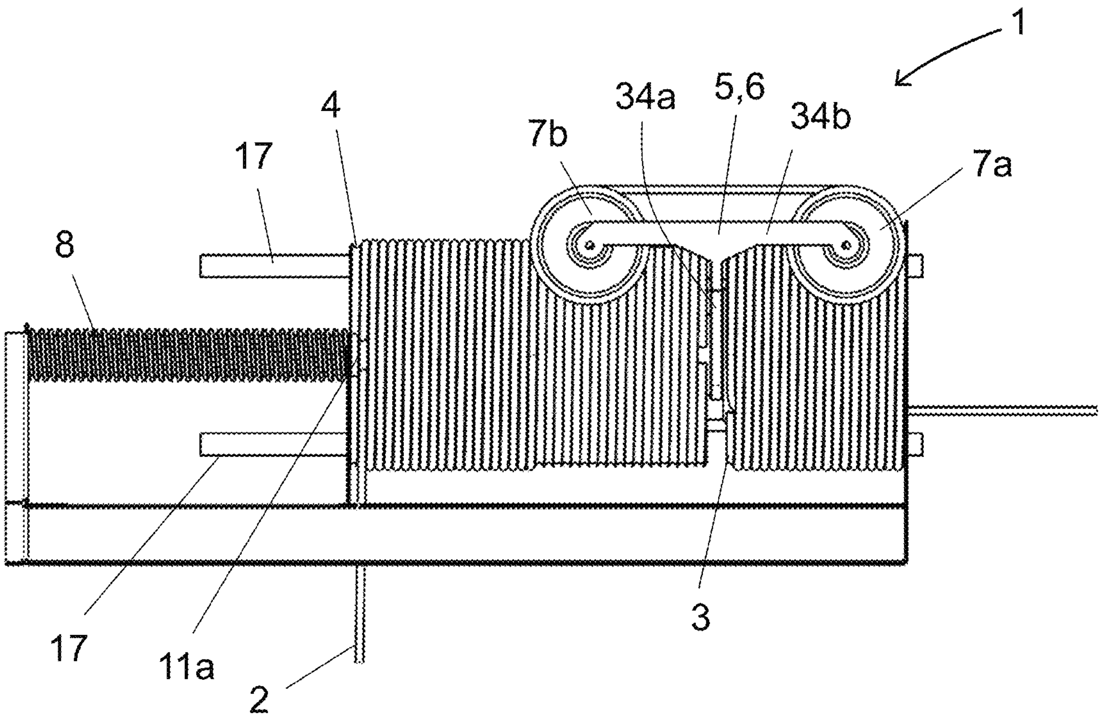
FIGS. 3*a* and 3*b* are front elevation views of the reeling device of FIG. 1 with the cable fully coiled and fully uncoiled, respectively.
Figure 3B:
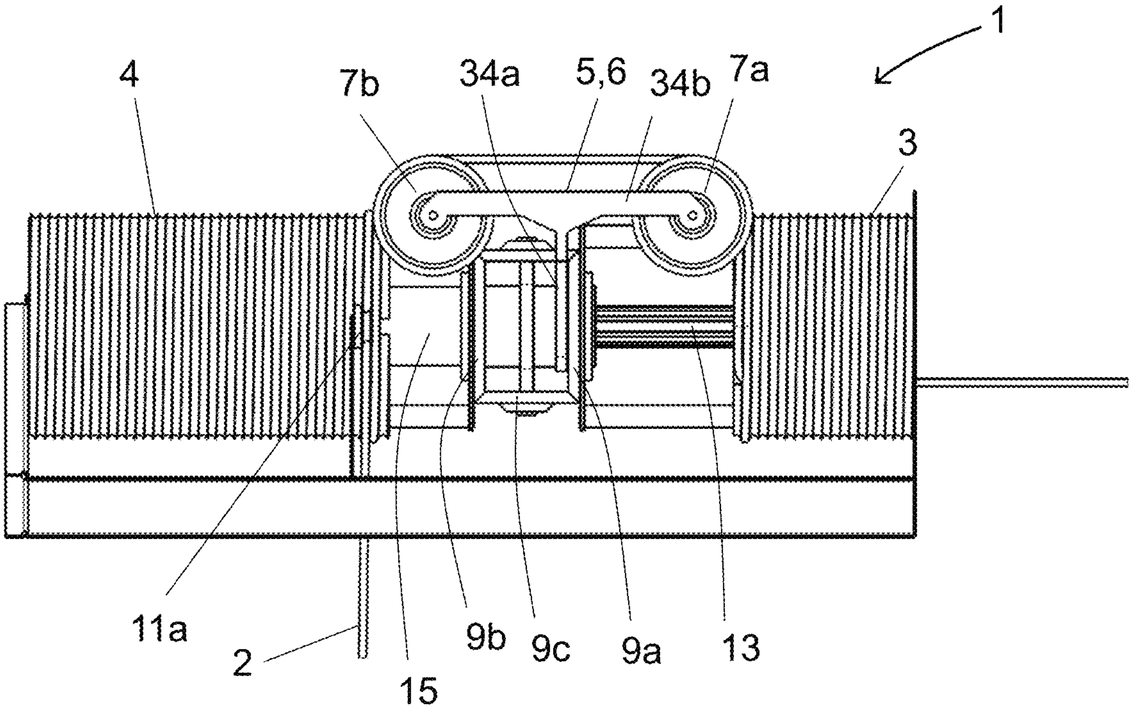

An intermediate guide 5 is provided for guiding the cable 2 between the reels 3, 4. The intermediate guide 5 in the present arrangement is rotatable about the axis, as is preferred. By such an arrangement, as seen in FIG. 2, the cable 2 can be guided substantially tangentially with respect to the second reel 4 at all times during reeling and unreeling of the cable. As is further preferred, rotation of the intermediate guide 5 in the present arrangement causes axial movement of the intermediate guide 5. By such axial movement, as seen in FIGS. 3*a* and 3*b*, the intermediate guide 5 is suitably axially aligned with the point of the second reel 4 at which the cable is fed on/off the second reel 4 at all times. The rotation and axial movement of the second reel 4 are preferably proportional to the rotation and axial movement of the intermediate guide 5 to achieve such a desired effect.

The intermediate guide 5, further, as it rotates, acts to coil/uncoil the cable from the first reel. In the present arrangement, as is preferred, the configuration of the intermediate guide 5 is such that the cable 2 is also guided substantially tangentially with respect to the first reel 3 at all times and such that the intermediate guide 5 is also suitably axially aligned with the point of the first reel 3 at which the cable is fed on/off the first reel 3 at all times.

In the present arrangement, the intermediate guide 5 comprises an arm 6 which comprises first and second guide members 7*a*, 7*b*. The arm 6 further comprises a support portion 34*a* (shown in a vertical orientation in FIGS. 3*a* and 3*b*) and a bridge portion 34*b* (shown in a horizontal orientation in FIGS. 3*a* and 3*b*). The support portion is directly or indirectly driven to rotate, by an electric motor in this embodiment. The first and second guide members 7*a*, 7*b* are located at or adjacent opposing ends of the bridge portion 34*b* of the arm 6.

The first guide member 7*a* guides the cable 2 with respect to the first reel 3 and the second guide member 7*b* guides the cable 2 with respect to the second reel 4. For such purposes, the first guide member 7*a* overlaps with the first reel 3 when viewed in a radial direction and the second guide member 7*b* overlaps with the second reel 4 when viewed in a radial direction. With reference to FIG. 3*a*, the first and second guide members fully overlap the first reel and second reels respectively. With reference to FIG. 3*b*, the first and second guide members partly overlap the first and second reels respectively.

In accordance with the discussion above, the points of the first and second guide members 7*a*, 7*b* at which the cable 2 is fed on/off the first and second guide members 7*a*, 7*b* are respectively axially aligned with the first and second reels 3, 4 at the points at which the cable 2 is fed on/off the first and second reels 3, 4.

The first and second guide members 7*a*, 7*b* comprise pulleys in the present arrangement, which is preferred to avoid wear on the cable. The guide members 7*a*, 7*b* could be otherwise arranged. They could, for example, be non-rotating and have a low-friction surface over which the cable 2 slides. By rotation of the arm 6, the guide members 7*a*, 7*b* (and the portion of cable extending between the guide members) maintain tangential alignment with the first and second reels 3, 4 at all times.

Figure 5:
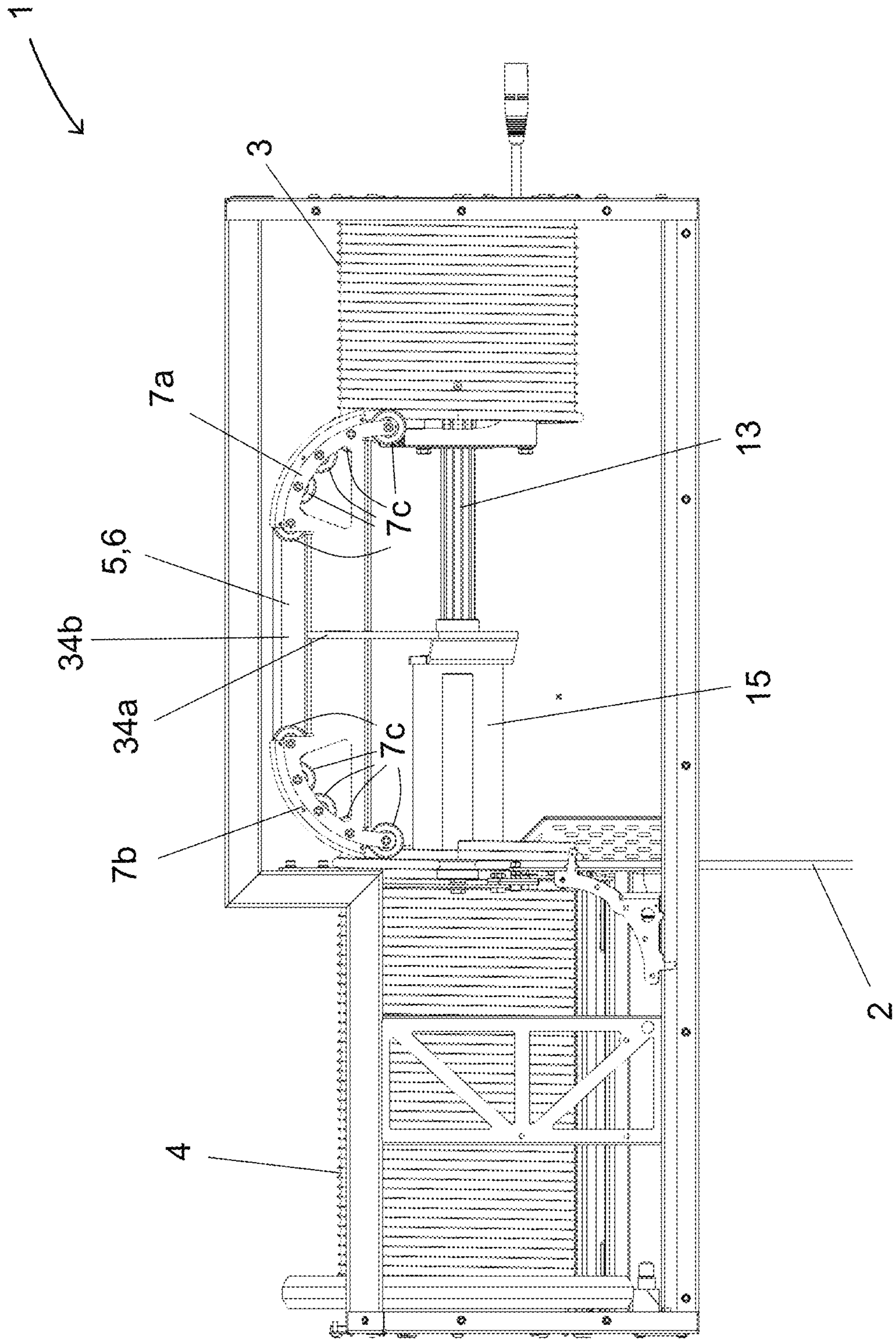
FIG. 5 is a front elevation view of the reeling device of FIG. 1, in which an alternative arrangement of the intermediate guide is provided.

One possible alternative arrangement of the first and second guide members 7*a*, 7*b* is shown in FIG. 5. Here, the first and second guide members 7*a*, 7*b* each comprise a set of pulley sheaves 7*c* arranged in an arc. By this arrangement, the bend radius of the cable 2 passing over the first and second guide members 7*a*, 7*b* is defined by the angle of the arc of the pulley sheaves 7*c*. This arrangement may be particularly advantageous where the cable 2 has a relatively large minimum allowable bend radius, since the bend radius of the cable 2 can be increased without the need to use excessively large pulleys as the first and second guide members 7*a*, 7*b*. In a further alternative arrangement, the first and second guide members 7*a*, 7*b* could be replaced with a single larger pulley. In such a case, the points of the pulley at which the cable 2 is fed on/off the pulley will be respectively axially aligned with the first and second reels 3, 4 at the points at which the cable 2 is fed on/off the first and second reels 3, 4. In other words, the diameter of the single pulley would be suitably set.

In the present arrangement, as is preferred, the first and second reels 3, 4 have the same diameter as one another. This has a number of benefits, as will be readily appreciated by those skilled in the art, including simplifying the construction of the device. In alternative arrangements, however, the reels 3, 4 could have different diameters. With the first and second reels 3, 4 having the same diameter as one another, the rotation and axial movement of the second reel 4 will be double the speed of the rotation and axial movement of the intermediate guide 5 for maintaining positioning of the guide, as discussed above, with respect to the first and second reels 3, 4. The proportional speeds (rotationally and axially) will vary with relative changes to the diameters of the first and second reels 3, 4, as will be readily appreciated by those skilled in the art.

Figure 4:
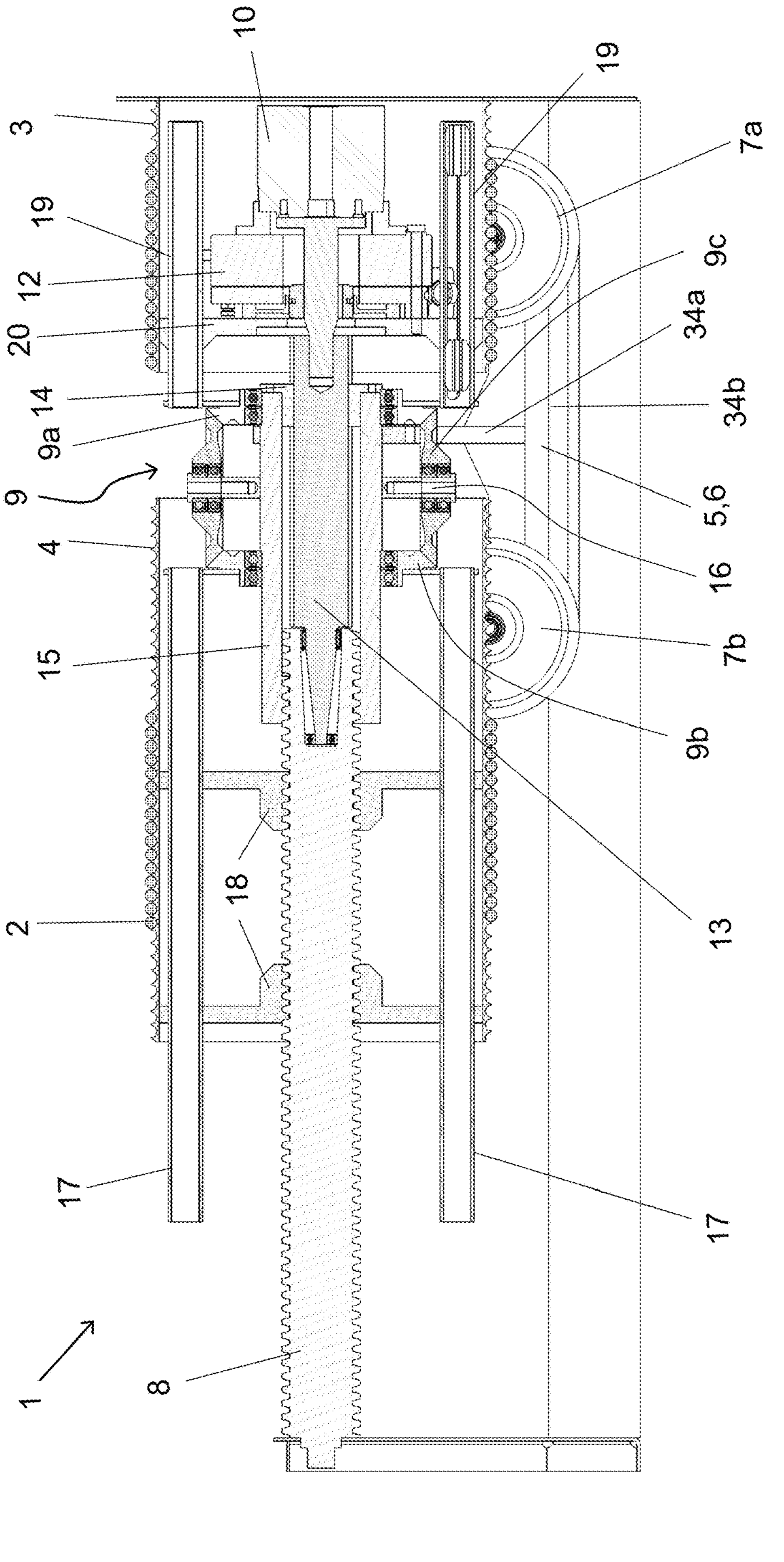
FIG. 4 is a sectional front view of the reeling device of FIG. 1.

In the present arrangement, as best seen in FIG. 4, the intermediate guide 5 is rotatably driven by an electric motor 10. The motor 10 is preferably directly coupled (i.e. connected in a manner that does not rely on friction and so will not slip) to the intermediate guide 5. The motor 10 preferably comprises a servomotor. The servomotor may be combined with a gearbox in a single package to provide a servo drive. The motor/servo drive 10 is preferably housed within a drum of the first reel 3 as seen in FIGS. 1 and 4. A positional encoder will preferably be provided, which may take any suitable conventional form. Axial movement of the intermediate guide 5 is effected by virtue of a lead screw 8. A gear drive 9 is provided for transmitting rotary force to the second reel 4. Axial movement of the second reel 4 is also effected by the lead screw 8.

The gear drive 9 ensures that proportional rotational (and axial) movement between the second reel 4 and the intermediate guide 5 is maintained, which is preferable. In alternative arrangements, however, the gear drive 9 may be omitted. In arrangements omitting the gear drive 9, the second reel 4 will be loose with rotation of the second reel 4 effected by the frictional connection to the reeling and unreeling of the cable 2 alone.

One or more brakes are preferably provided. It is particularly preferable, as in the present arrangement, that a holding brake 12 is provided on the output side of the motor/drive gearbox (if used). Such a brake is preferably directly connected to a drum of the first reel 3, as shown in FIG. 4. The brake 12, preferably comprises an electromagnetic brake, as again shown in FIG. 4. The electromagnetic brake may take any conventional form. There may be additional brakes provided and/or positive-break direct struck limit switches.

As clearly shown in the figures, the cable 2 is helically coiled about each of the first and second reels in a single layer without overlap. This helps ensure accuracy throughout the life of the device. Either or both of the first and second reels 3, 4 may be provided with a helical groove for guiding/aligning the cable 2 as it is coiled, wherein the cable is received by the groove. In the present arrangement, both reels 3, 4 are provided with helical grooves. In alternative arrangements, the helical grooves may be omitted entirely.

With the axial movement of the second reel 4, as discussed, it is possible to provide a zero fleet reeling device, i.e. a device where the radial and axial location and the orientation of the portion of the cable adjacent the second end of the cable 2 that is fed on/off the second reel 4 does not change during reeling unreeling of the cable. This is again preferred for the purpose of ensuring accurate operation and ease of installation, for example where the cable is required to drop though a small hole in a ceiling. An end guide 11 is preferably provided for guiding the cable on/off the second reel 4. The end guide 11 is fixed against axial movement. In the present arrangement, the end guide 11 comprises a guide wheel 11*a*.

The drive mechanism will now be described in greater detail. It must be appreciated, however, that numerous modifications may be made without impacting the operation of the reeling device 1, as fundamentally defined by claim 1. The present invention is not to be limited to the exemplary drive mechanism described.

The motor/servo drive 10 rotates a splined shaft 13. The splined shaft 13 is fixed against axial movement. The lead screw 8 is fixed against both rotation and axial movement. A splined bush 14 engages the spline of the splined shaft 13. The splined bush 14 is fixed to a hollow shaft 15 that receives the splined shaft 13. The hollow shaft 15 threadably engages the lead screw 8. The intermediate guide 5 is fixed to the hollow shaft 15.

By the above arrangement, rotation of the splined shaft 13 effects rotation and axial movement of the intermediate guide 5.

As discussed, in the present arrangement, the gear drive 9 is provided. This comprises bevel gears 9*a*, 9*b* and 9*c* as shown in FIG. 4. Bevel gears 9*a* and 9*b* are mounted on the hollow shaft 15 via bearings to allow relative rotation therebetween. Bevel gear 9*a* is held against rotation relative to the first reel 3 by guide members 19. In the present arrangement, these are formed as tubes. In alternative arrangements they could be otherwise formed. Bevel gears 9*c* engage bevel gears 9*a* and 9*b* with their axes perpendicular thereto (and perpendicular to the motor/servo drive 10 axis). Bevel gears 9*c* are mounted on shafts 16 that extend radially outward from the hollow shaft 15 and are fixed to the hollow shaft 15 to rotate therewith. Bevel gears 9*c* are mounted on the shafts 16 via bearings to allow for suitable rotation. Guide tubes 17, which extend parallel to the motor/servo drive 10 axis are fixed with respect to the bevel gear 9*b* to rotate therewith. The guide tubes 17 are slidably received by bushes 18 that are fixed to the second reel 4 and are provided inside a drum of the second reel 4. The bushes 18 threadably engage the lead screw 8, which is static. Guide tubes 19 are similarly engaged in bushes within a support flange 20 of the fixed drum 3.

By the above arrangement, rotation of the splined shaft 13 effects rotation and axial movement of the second reel 4.

Figure 6:
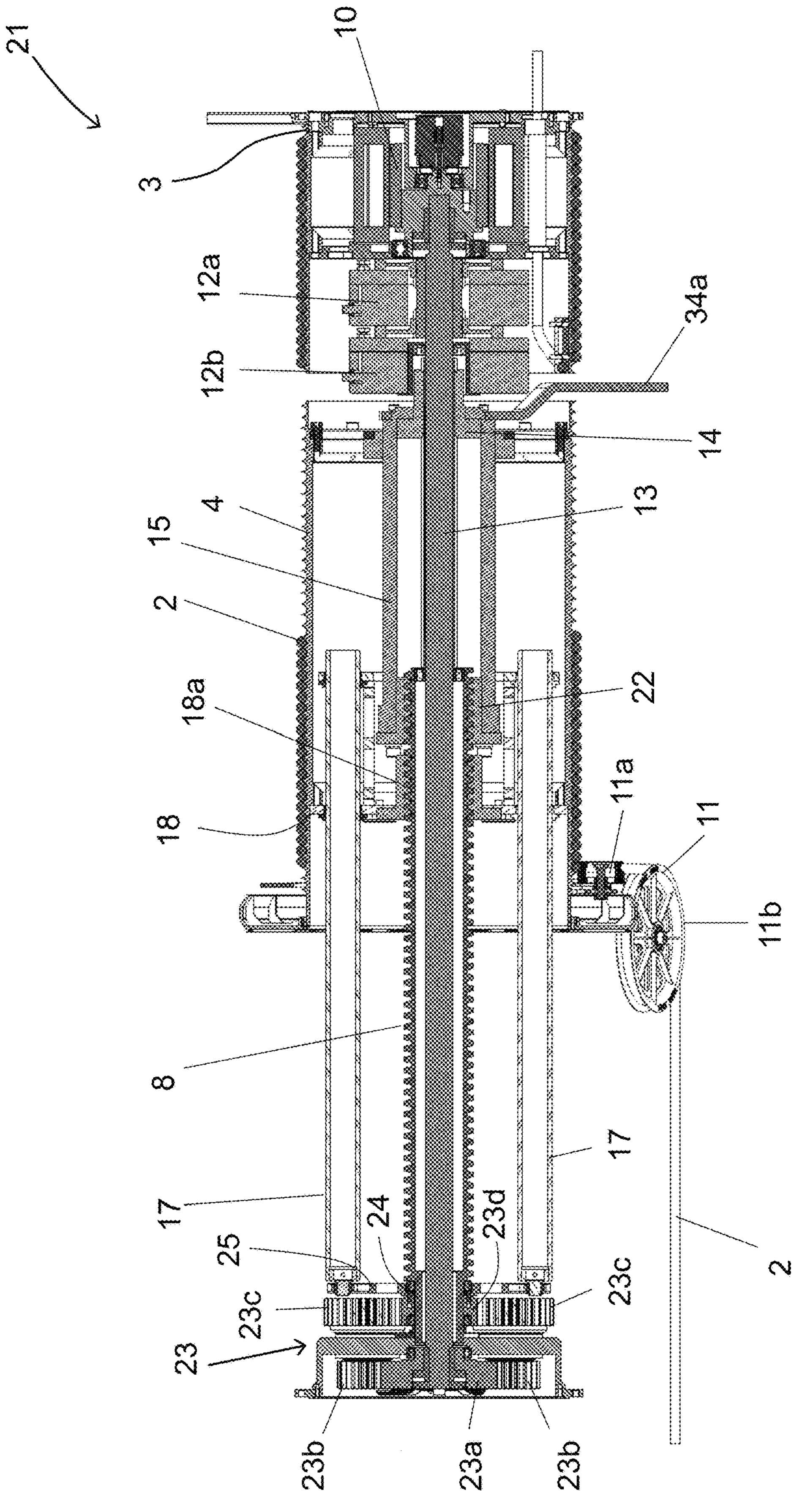
FIG. 6 is a sectional front view of a reeling device according to a second embodiment of the present invention.

FIG. 6 shows a reeling device 21 in accordance with a second embodiment of the present invention, which comprises an alternative drive mechanism to the reeling device 1 of FIGS. 1 to 4. Corresponding features are indicated with like numerals.

Rotation and axial movement of the intermediate guide 5 are effected by rotation of the splined shaft 13 by the motor/servo drive 10, in substantially the same manner as described above with respect to the first embodiment. Splined bush 14 engages the spline of the splined shaft 13 and is fixed to a hollow shaft 15 that receives the splined shaft 14. In this embodiment, the hollow shaft 15 threadably engages the lead screw 8 via a threaded bush 22. The intermediate guide 5 is fixed to the hollow shaft 15 via the support portion 34*a* of the arm 6, to rotate therewith.

In place of gear drive 9, an alternative gear drive 23 is provided. Gear drive 23 comprises spur gears 23*a*, 23*b*, 23*c* and 23*d*. Spur gear 23*a* is fixed to an end of the splined shaft 13 to rotate therewith. Spur gear 23*a* engages with spur gears 23*b*. Spur gears 23*c* are coaxially fixed to spur gears 23*b* to rotate therewith. Spur gears 23*c* engage with spur gear 23*d*, which is mounted on a shaft portion 24 of the lead screw 8 via bearings to allow for rotation of spur gear 23*d* about the shaft portion 24. Guide tubes 17 are fixed to spur gear 23*d* via connecting arm 25, such that the guide tubes 17 rotate with spur gear 23*d*. The guide tubes 17 are slidably received by a bush 18 that is fixed to the second reel 4 and is provided inside a drum of the second reel 4. A threaded portion 18*a* of the bush 18 threadably engages the lead screw 8, which is static.

By the above arrangement, rotation of the splined shaft 13 effects rotation of the guide tubes 17 via the gear drive 23, which is turn effects rotation of the second reel 4. Rotation of the second reel 4 causes a concurrent axial movement of the second reel 4 by means of the threaded engagement of bush 18 with the static lead screw 8.

As also shown in FIG. 6, the reeling device 21 further comprises a pair of holding brakes 12*a*, 12*b*, which are directly connected to a drum of the first reel 3.

The end guide 11 of the reeling device 21 comprises a guide wheel 11*a* and a pulley 11*b*. In the illustrated embodiment, the pulley 11*b* is arranged to direct the cable 2 in a direction parallel with the axis of the first reel 3 and second reel 4. In alternative arrangements, the pulley may direct the cable 2 in any desired direction.

Figure 7:
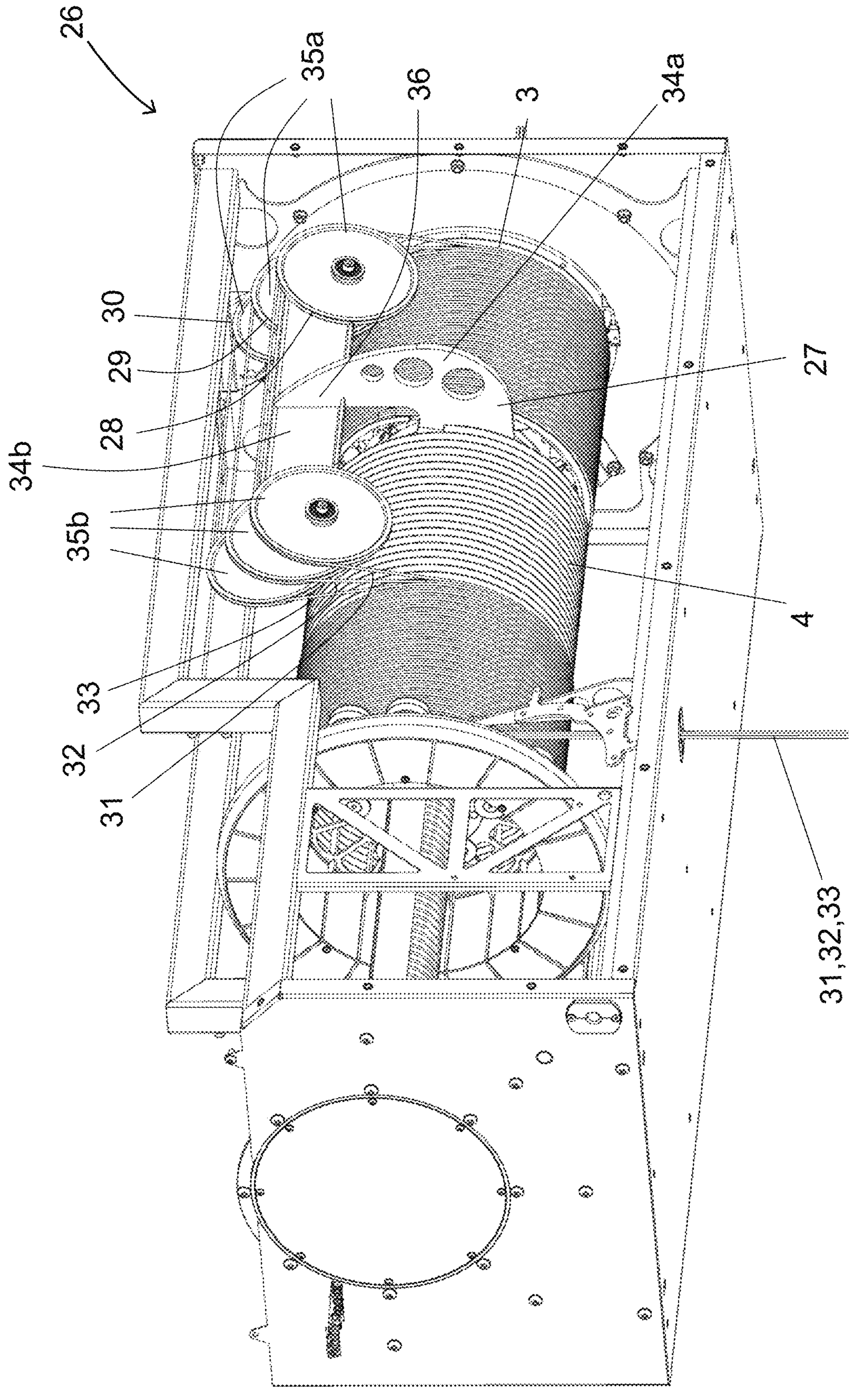
FIG. 7 is a front perspective view of a reeling device according to a third embodiment of the present invention.

With reference to FIG. 7, there is shown a reeling device 26 in accordance with a third embodiment of the present invention. Features in common with the first embodiment are indicated with like numerals.

The reeling device 26 of the third embodiment comprises an intermediate guide assembly 27 comprising a plurality of intermediate guides 28, 29, 30 for guiding a plurality of cables 31, 32, 33 between the first and second reels 3, 4. A first intermediate guide 28 guides a first cable 31, a second intermediate guide 29 guides a second cable 32 and a third intermediate guide 30 guides a third cable 33. Each of the first, second and third intermediate guides 28, 29, 30 may be arranged with respect to the first reel 3 and the second reel 4 in the same manner as the single intermediate guide 5 described above with respect to the first embodiment of the present invention.

According to this arrangement, the reeling device can be used for coiling/uncoiling multiple cables without tangling of the cables. It will be appreciated that any number of intermediate guides may be provided according to the number of cables to be coiled/uncoiled using the reeling device.

In the arrangement shown in FIG. 7, the first, second and third intermediate guides 28, 29, 30 are rotationally fixed with respect to each other, such that the first, second and third intermediate guides 28, 29, 30 are rotatable about the axis with each other. Each intermediate guide comprises an arm 36 which comprises first and second guide members 35*a*, 35*b*, a support portion 34*a* and a bridge portion 34*b*. To achieve this rotation, the bridge portions 34*b* of the first, second and third intermediate guides 28, 29, 30 are all fixed to a common support portion 34*a* and thus form a unitary intermediate guide assembly 27. Rotation of the support portion 34*a*, and thus the first, second and third intermediate guides 28, 29, 30, is effected by rotation of a central shaft driven by a motor/servo drive of the reeling device 26, in substantially the same manner as described above with respect to the first embodiment of the present invention.

The first, second and third intermediate guides 28, 29, 30 guide the first, second and third cables 31, 32, 33, respectively, substantially tangentially with respect to the first reel 3 and the second reel 4 at all times during reeling and unreeling of the cable.

In the arrangement shown in FIG. 7, each of the first, second and third intermediate guides 28, 29, 30 comprises the first guide member 35*a* and the second guide member 35*b* connected by the bridge portion 34*b* of the arm 36. Each first guide member 35*a* guides a respective one of the first, second and third cables 31, 32, 33 with respect to the first reel 3. Each second guide member 35*b* guides a respective one of the first, second and third cables 31, 32, 33 with respect to the second reel 4.

In the arrangement described above, the first, second and third intermediate guides 28, 29, 30 are substantially identical in structure. However, it will be appreciated that, in embodiments of the present invention comprising a plurality of intermediate guides, the respective intermediate guides may adopt different structures to each other according to the requirements of the cables to be coiled/uncoiled using the reeling device.

Figure 8:
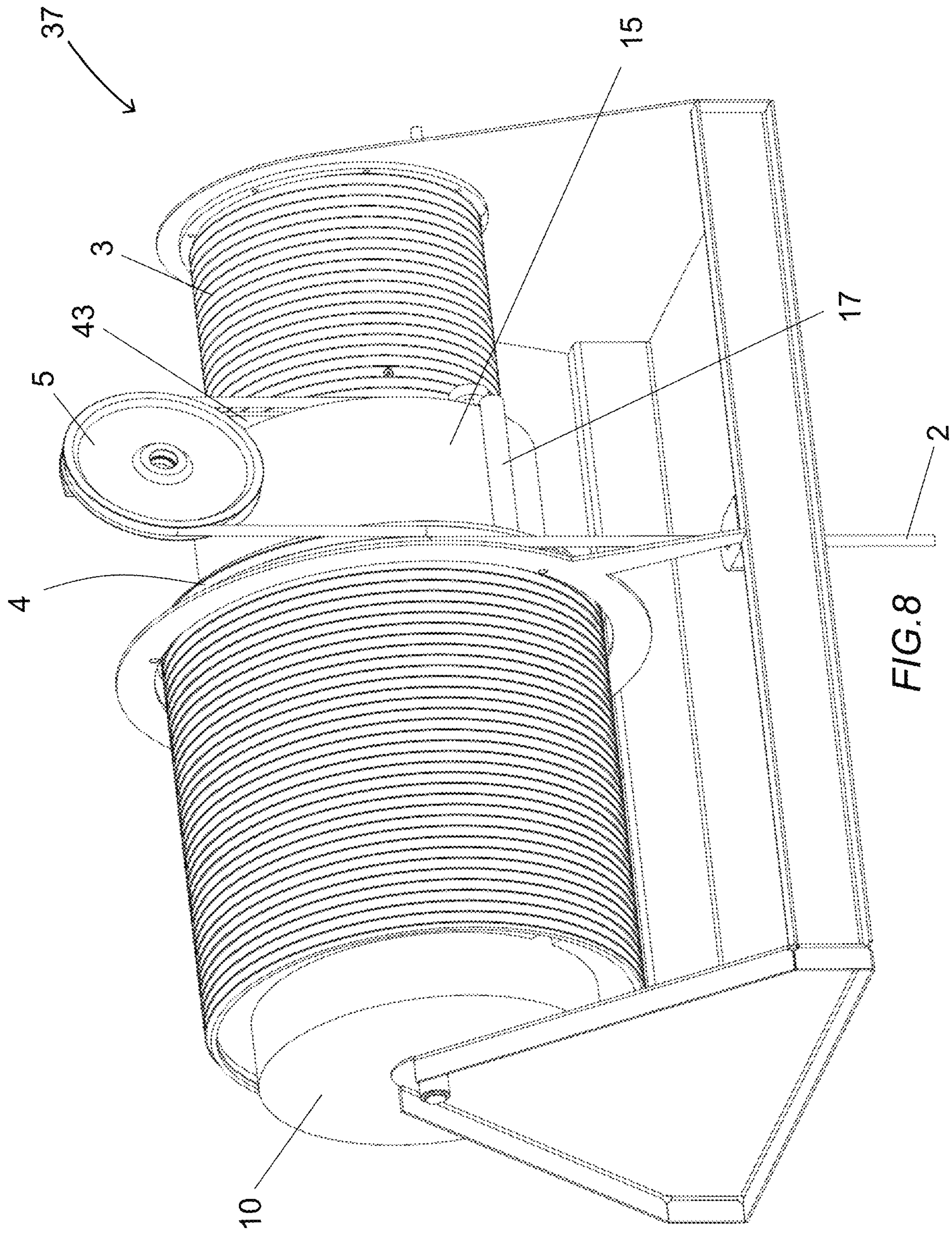
FIG. 8 is a front perspective view of a reeling device according to a fourth embodiment of the present invention.
Figure 9A:
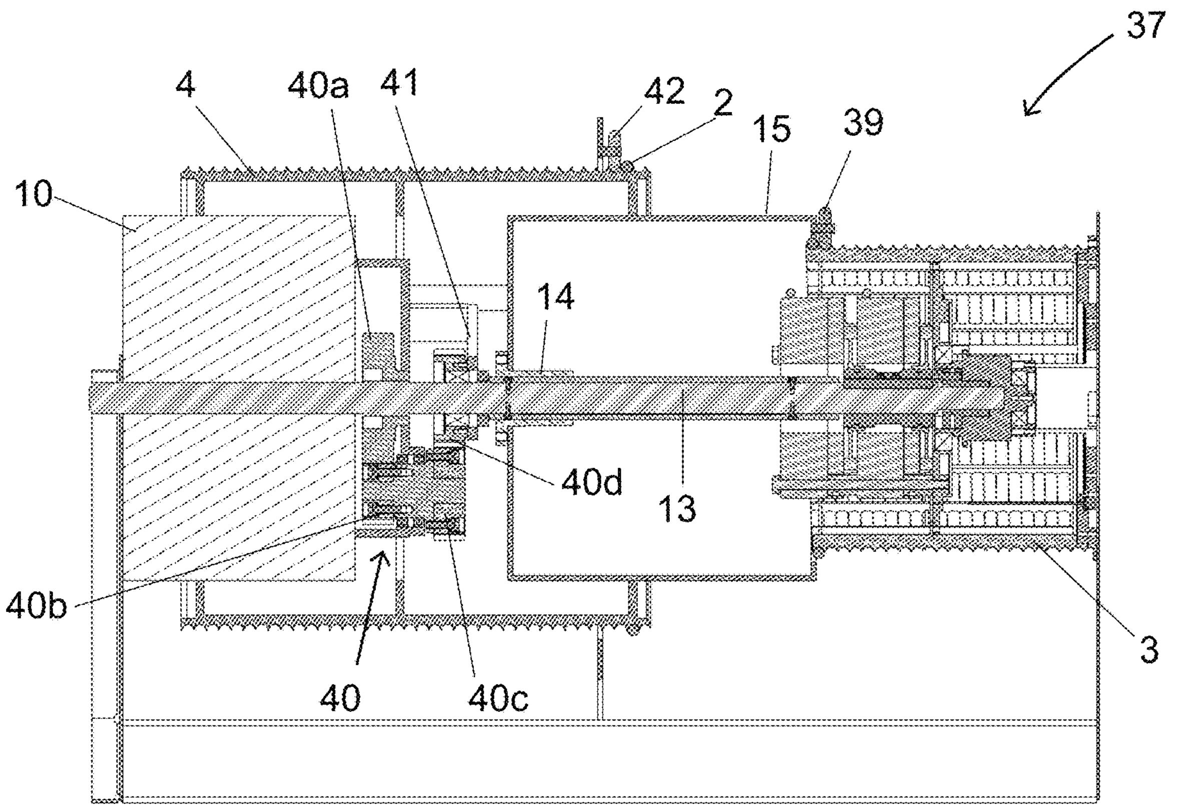
FIGS. 9*a* and 9*b* are sectional front views of the reeling device of FIG. 8, with the second reel in first and second axial positions, respectively.
Figure 9B:
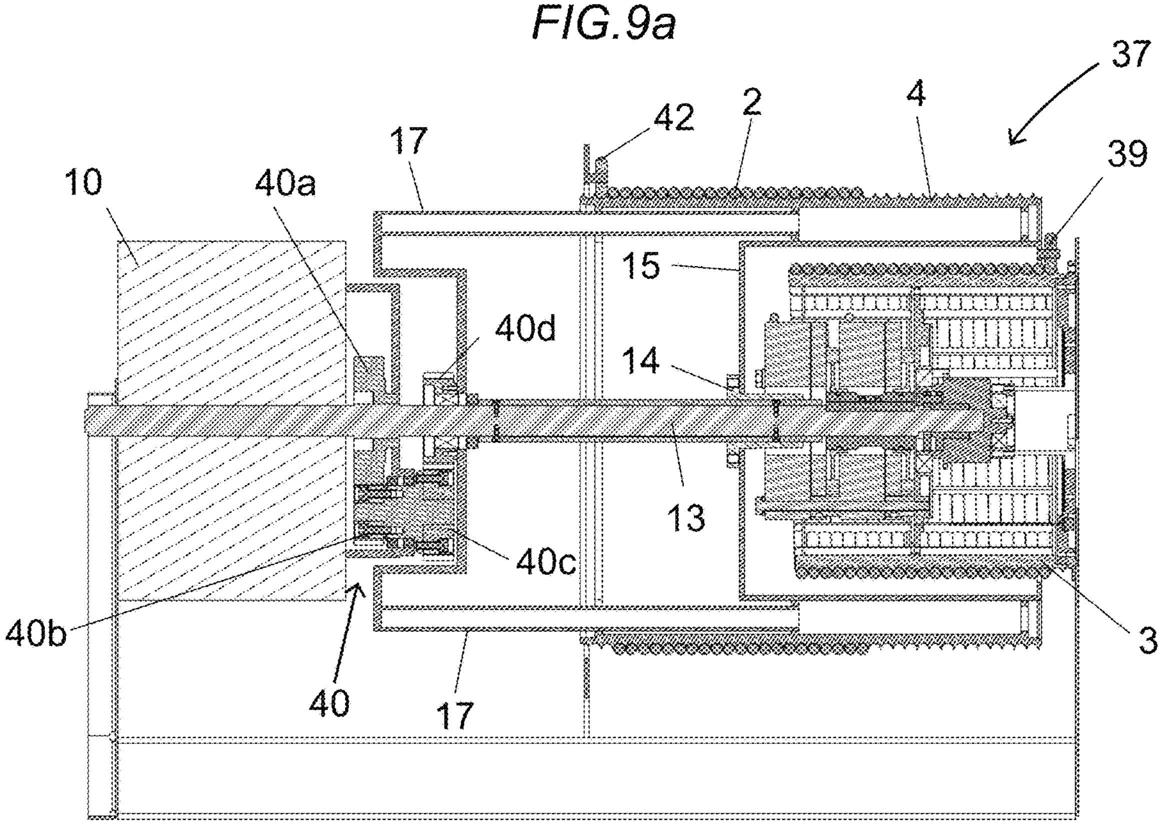

With reference to FIGS. 8, 9*a* and 9*b*, there is shown a reeling device 37 in accordance with a fourth embodiment of the present invention. Features in common with the first embodiment are indicated with like numerals.

In the arrangement shown, the diameter of the first reel 3 is smaller than the diameter of the second reel 4. Accordingly, it is possible for the second reel 4 to move from an axial position in which there is no overlap between the first and second reels 3, 4 when viewed in a radial direction, as shown in FIG. 9*a*, to an axial position in which the first and second reels 3, 4 overlap when viewed in a radial direction, such that the second reel 4 surrounds the first reel 3, as shown in FIG. 9B. This configuration offers a more compact arrangement, which may be particularly beneficial when the reeling device 37 is being used to coil/uncoil larger cables, which will require a relatively large motor.

As shown in FIG. 8, the intermediate guide 5 is in the form of a single pulley. The diameter of the pulley is suitably set such that the points of the pulley at which the cable 2 is fed on/off the pulley are respectively axially aligned with the first and second reels 3, 4 at the points at which the cable 2 is fed on/off the first and second reels 3, 4.

The reeling device 37 comprises an alternative drive mechanism, which could also be used in any of the embodiments of the present invention hereinbefore described. With reference to FIGS. 9*a* and 9*b*, in particular, a motor/servo drive 10 rotates a splined shaft 13, which is fixed against axial movement. A splined bush 14 engages the spline of the splined shaft 13. The splined bush 14 is fixed to a hollow shaft 15, to which the intermediate guide 5 is fixed via arm 43 (shown in FIG. 8). Rotation of the splined shaft 13 therefore effects rotation of the hollow shaft 15 and the intermediate guide 5.

A roller 39 is fixed to one end of the hollow shaft 15. The roller 39 engages with the helical grooves of the first reel 3. Accordingly, rotation of the hollow shaft 15 effects axial movement of the hollow shaft 15 and the intermediate guide 5 via the roller 39. In an alternative arrangement, a series of rollers may be provided, the rollers being arranged helically to engage with the helical grooves of the first reel 3.

A gear drive 40 is provided to transfer rotational movement of the splined shaft 13 to the second reel 4. A spur gear 40*a* is fixed to the splined shaft 13 to rotate therewith. Spur gear 40*a* engages with spur gear 40*b*, which is coaxially fixed with spur gear 40*c*. Rotation of spur gear 40*b* effects rotation of spur gear 40*c*. Spur gear 40*c* engages with spur gear 40*d*, which is mounted on the shaft 13 via bearings to allow for independent rotation of spur gear 40*d* about the shaft 13. Guide tubes 17 are fixed to spur gear 40*d* via connecting arm 41, such that the guide tubes 17 rotate with spur gear 40*d*. The guide tubes 17 are slidably received by the second reel 4 inside a drum of the second reel 4, such that the second reel 4 rotates with the guide tubes 17.

A roller 42 engages with the helical grooves of the second reel 4. The roller 42 is fixed against axial movement. Accordingly, rotational movement of the second reel 4 effects axial movement of the second reel 4 via the roller 42. In an alternative arrangement, a series of rollers may be provided, the rollers being arranged helically to engage with the helical grooves of the second reel 4.

By the above arrangement, rotation of the shaft 13 effects rotation and axial movement of the second reel 4.

The above exemplary described arrangements provide a number of non-limiting exemplary benefits, including but not limited to the following:

1. No break in the cable—so no degradation in signal quality/no interference.
2. Accurate single layer wrap for the cable—enabling accurate positioning of a microphone (or other reeled electrical device (or optical data device using a fibre optic cable)) with no compression of the cable.
3. Directly-coupled servo motor with positioning encoder—further enabling accuracy.
4. High loads are possible (6 kg as configured in the depicted arrangement, compared to typical 1 kg on existing prior-art devices)—enabling the use of microphone 'frames' carrying multiple microphones. The ability to support such frames is enhanced by the ability to accurately position them, in line with 2 and 3 above.
5. An adequately-sized holding brake on the output side of a drive gearbox (if used), directly connected to the splined shaft. Also, positive-break, direct struck limit switches. The brake and limit arrangement complies with current regulations pertaining to lifting loads over an audience.
6. Adaptability—the device can be adapted to virtually any load/cable-type/stroke requirement.

7. Virtually no cable is retained in the device when the cable is fully deployed, minimising cable run distance.
8 The reeling device is 'zero fleet' i.e. the radial and axial location and the orientation of the portion of the cable adjacent the second end of the cable that is fed on/off the second reel does not change during reeling and unreeling of the cable. This provides the ability to locate the device directly over a hole in an auditorium ceiling for example.

The invention has been described above with reference to specific embodiments, given by way of example only. It will be appreciated that many different arrangements of the system are possible, which fall within the scope of the appended claims.

I claim:

1. A reeling device for the controlled coiling and uncoiling of a cable having a first end that is fixed and a second end that is movable relative to the first end, the cable is unbroken between the first and second ends, the reeling device comprising:
- first and second reels about which the cable is coiled, wherein the first and second reels are coaxial,
- wherein the first reel is fixed against rotation and axial movement, and
- wherein the second reel is rotatable about a longitudinal axis of the first reel with such rotation causing axial movement of the second reel relative to the first reel.

2. The reeling device as in claim 1, wherein an intermediate guide is provided for guiding the cable between the first and second reels.

3. The reeling device as in claim 2, wherein the intermediate guide is rotatable about the axis, wherein rotation of the intermediate guide causes axial movement of the intermediate guide.

4. The reeling device as in claim 3, wherein the rotation and axial movement of the second reel are proportional to the rotation and axial movement of the intermediate guide.

5. The reeling device as in claim 4, wherein a gear drive is provided for maintaining proportionality of the rotational and axial movement between the second reel and the intermediate guide.

6. The reeling device as in claim 2, wherein the intermediate guide comprises an arm, which comprises one or more guide members for guiding the cable with respect to the first and second reels.

7. The reeling device as in claim 6, wherein the arm comprises first and second guide members, wherein the first guide member overlaps with the first reel and the second guide member overlaps with the second reel.

8. The reeling device as in claim 6, wherein the one or more guide members each comprise one or more pulleys.

9. The reeling device as in claim 6, wherein the one or more guide members are retained in tangential alignment with the first and second reels respectively at all times.

10. The reeling device as claimed in claim 2, further comprising a plurality of intermediate guides for guiding a plurality of cables between the first and second reels, wherein each intermediate guide is arranged to guide a respective one of the plurality of cables between the first and second reels.

11. The reeling device as in claim 1, wherein the first and second reels have the same diameter.

12. The reeling device as in claim 1, wherein the first and second reels have different diameters.

13. The reeling device as claimed in claim 12, wherein the diameter of the first reel is smaller than the diameter of the second reel.

14. The reeling device as claimed in claim 13, wherein the second reel is arranged to surround at least a portion of the first reel in at least one axial position of the second reel.

15. The reeling device as claimed in claim 1, wherein the cable is helically coiled about each of the first and second reels in a single layer without overlap.

16. The reeling device as claimed in claim 1, wherein the first reel and/or the second reel comprises a helical groove for receiving the cable.

17. The reeling device as claimed in claim 1, wherein an end guide is provided for guiding the cable on and off the second reel.

18. The reeling device as claimed in claim 17, wherein the end guide is fixed against axial movement.

19. The reeling device as in claim 17, wherein the end guide comprises a guide wheel.

20. A system, comprising:
- a plurality of reeling devices, each reeling device as in claim 1; and
- a frame or device that is supported at the second ends of the cables of the plurality of reeling devices, wherein a controller is provided for synchronously coiling/uncoiling the cables for raising or lowering the frame or device.

21. A reeling device for the controlled coiling and uncoiling of a cable having a first end that is fixed and a second end that is movable relative to the first end, the cable is unbroken between the first and second ends, the reeling device comprising:
- first and second reels about which the cable is coiled, wherein the first and second reels are coaxial,
- wherein the first reel is fixed against rotation and axial movement,
- wherein the second reel is rotatable about a longitudinal axis of the first reel with such rotation causing axial movement of the second reel relative to the first reel,
- wherein the first and second reels have the same diameter,
- wherein the rotation and axial movement of the second reel are proportional to the rotation and axial movement of the intermediate guide, and
- wherein the rotation and axial movement of the second reel are double the speed of the rotation and axial movement of the intermediate guide.

* * * * *